United States Patent
Matsushima

(10) Patent No.: US 6,401,322 B1
(45) Date of Patent: *Jun. 11, 2002

(54) METHOD OF MANUFACTURING A SEALING APPARATUS

(75) Inventor: Noboru Matsushima, Fukushima-ken (JP)

(73) Assignee: NOK Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/823,552

(22) Filed: Mar. 25, 1997

(30) Foreign Application Priority Data

Mar. 25, 1996 (JP) .............................. 8-094848
Feb. 5, 1997 (JP) .............................. 9-036992

(51) Int. Cl.[7] .......................... B21D 53/84; F16J 15/32
(52) U.S. Cl. ..................... 29/460; 29/888.3; 29/527.4; 264/320; 425/DIG. 47; 277/353; 277/549; 277/562; 277/572; 277/575
(58) Field of Search .............................. 377/353, 549, 377/551, 559, 562, 564, 565, 572, 575, 576, 924; 29/888.3, 460, 527.4; 264/262, 263, 268, 320; 425/DIG. 47

(56) References Cited

U.S. PATENT DOCUMENTS

| | | | | |
|---|---|---|---|---|
| 3,250,541 A | * | 5/1966 | McKinven, Jr. | 277/562 X |
| 3,276,783 A | * | 10/1966 | McKinven, Jr. | 277/562 |
| 4,623,153 A | * | 11/1986 | Nagasawa | 277/551 |
| 4,672,733 A | * | 6/1987 | Schmitt | 264/262 |
| 4,723,350 A | * | 2/1988 | Kobayashi et al. | 277/559 X |
| 4,867,926 A | * | 9/1989 | Matsushima | 264/154 |
| 5,104,603 A | * | 4/1992 | Saitoh | 425/DIG. 47 |
| 5,106,565 A | * | 4/1992 | Saitoh | 264/263 |
| 5,149,106 A | * | 9/1992 | Takenaka et al. | 277/559 X |
| 5,183,271 A | * | 2/1993 | Wada et al. | 277/559 X |
| 5,183,617 A | * | 2/1993 | Saitoh | 264/263 |
| 5,577,741 A | * | 11/1996 | Sink | 277/152 |
| 5,595,697 A | * | 1/1997 | Wada et al. | 264/268 |
| 5,791,658 A | * | 8/1998 | Johnston | 277/559 |

FOREIGN PATENT DOCUMENTS

| | | | | |
|---|---|---|---|---|
| JP | 58-209437 | * | 12/1983 | 29/527.4 |
| JP | 3-234977 | | 10/1991 | |

* cited by examiner

*Primary Examiner*—Peter Vo
*Assistant Examiner*—A. Dexter Tugbang
(74) *Attorney, Agent, or Firm*—Jacobson Holman, PLLC

(57) ABSTRACT

A method of manufacturing a sealing apparatus has an annular sealing lip formed of a resin material, a reinforcing ring having a bent section for nipping the peripheral; end portion of the annular sealing lip, and a sealing portion formed of a rubber-like elastic material and vulcanization formed integrally with the reinforcing ring and the annular sealing lip. Metal rings and a PTFE sealing member which are integrally assembled in such a manner that the inside surface of he peripheral portion of the metal ring is fitted to the outside surface of the peripheral portion of the metal ring to nip the sealing member having a sealing lip portion between the flange portion of the metal ring and the flange portion of the metal ring are integrally held by a rubber formed covering portion composed of an axial end portion, a peripheral fitting portion, a wall portion, a sealing lip portion, and a bonding airtight portion which are continuously formed.

6 Claims, 16 Drawing Sheets

METHOD OF MANUFACTURING A SEALING APPARATUS

BACKGROUND OF THE INVENTION

This invention relates to a sealing apparatus having a composite material consisting of a sealing lip formed of a resin material and a sealing portion formed of a rubber-like elastic material, and a method of manufacturing thereof.

A conventional sealing apparatus is manufactured by accumulating a number of parts, as shown in FIGS. 23, 24, followed by caulking.

The sealing apparatus 100 shown in FIG. 23 is assembled by continuously baking a rubber lip 102 and a peripheral gasket 103 direct to a peripheral side metal ring 101 followed by vulcanization forming, inserting a resin formed sealing member 104 and an assembly reinforcing metal ring 105, and mechanically caulking the end portion 101a on the sealed fluid side O of the peripheral side metal ring 101, opposite to the atmospheric side A. A sealing apparatus 200 is assembled, as shown in FIG. 24, by installing a sealing ring 202 onto the outside of a peripheral side metal ring 201, inserting a rubber lip 203, a resin sealing member 204, a flat washer-shaped metal ring 205, and a dust lip 206 to the inside thereof, and mechanically caulking the end portion 201a on the sealed fluid side O of the meal ring 201, opposite to the atmospheric side A. The sealing apparatus 100 significantly reduced the number of parts items, compared with the sealing apparatus 200, which has lead to the facilitation and reduction in cost of the manufacture.

However, some problems were encountered in assembling the sealing apparatuses of FIGS. 23 and 24, including the generation of powder or metal powder from a surface coat in addition to the complicated and expensive caulking process of the periphery in the aspect of process, and the rusting by breakage of the surface treatment coat, the reduction in sealing function by the adhesion of the above powder to a product, and the like in the aspect of quality of product. Further, the exposed peripheral metal surface often damaged the associated housing, affecting the sealing property.

Further another conventional sealing apparatus is shown in FIG. 25. This sealing apparatus 300 shown in FIG. 25, which seals the clearance between concentrically relatively moving housing 310 and shaft 311 separately to the atmospheric side O and the sealed side M, mainly comprises an L-shaped sectional metallic reinforcing ring 301 for holding the form of the sealing apparatus 300, a first sealing member 302 formed of a rubber-like elastic body which is vulcanization formed on the reinforcing ring 301, and a second sealing member 303 formed of a resin material which is fixed so as to be nipped by the reinforcing ring 301 and the first sealing member 302.

The reinforcing ring 301 has a fitting portion 301a for fixing the sealing apparatus 300 onto the inside surface of the housing 310 and a flange portion 301b extending radially inward from the fitting portion 301a, and the fitting portion 301a has a peripheral sealing portion 302a formed integrally with the first sealing member 302 on its outside surface.

The sealing portion of this sealing apparatus 300 is formed on two members compositely constituted, enabling the use under a severe condition where it is difficult to satisfy high sealing performance over a long period only with a lip formed of a general rubber-like elastic Body.

Namely, the sealing portion is provided with a first sealing lip 302b of the first sealing member 302 and a second sealing lip 303a of the second sealing member 303, and a different characteristics are imparted to the respective lips to make the sealing portion more functional.

In this conventional apparatus, a material having high wear resistance or heat insulating characteristic by PTFE (ethylene tetrafluoride), for example, is adapted as the resin material for the second sealing lip 303a, so that the second sealing lip 303a has a holding function for minimizing the wear or deformation even when energized to the sliding surface of a shaft 311 by a high pressure on the sealed side M in the operation of the sealing apparatus 300 (mainly the rotation of the shaft 311), and preventing the reversion or movement of the first sealing lip 302b, whereby the sealing performance can be held over a long period.

A thread groove 303b for generating a pumping effect is formed on the surface opposed to the sliding surface of the shaft 311 of the second sealing lip 303a, and it is worked so as to return to the sealed side M the sealed fluid which is apt to flow out from the sliding surface of the shaft 311 onto the atmospheric side A during the rotation of the shaft 311, thereby holding high sealing performance.

On the other hand, for the first sealing lip 302b of a rubber-like elastic body, the sealing of the sealed fluid in the stoppage of the shaft 311 is rather an important function in this prior art, although the sealing property by itself is necessary in the rotation of the shaft 311.

Thus, such a conventional apparatus is constituted so that the characteristics of two different materials can be brought out and skillfully utilized to attain high sealing property.

FIGS. 26a and 26b are views illustrating a method of manufacturing the sealing apparatus 300 shown in FIG. 25. For the detailed description, refer to Japanese Patent Application No. 2-27386 by the present applicant.

In FIG. 26a, a mold 400 mainly comprises a lower mold 401 and an upper mold 410. The lower mold 401 is divided into a first mold 402 defining the bottom surface, a second mold 403 defining the radially outer wall surface, and a core 404 defining the radially inner wall surface. The outside surface of he core 404 has a male screw portion 404a cut therein.

On the other hand, the lower surface of the upper mold 410 has an annular projecting portion 411 to be inserted into the lower mold 401. When the mold is clamped, an annular cavity 420 is formed between the projecting portion 411 and the lower mold 401.

The vulcanization forming of the sealing apparatus 300 is performed in the following manner.

A reinforcing ring 301, and a rubber material 302' as the second sealing member 303 and the first sealing member 302 are arranged in the lower mold 401 in this order.

As the second sealing member 303, a resin material such as PTFE is preliminarily formed into an L-shaped section by cutting work. Although it can be also considered that the second sealing member 303 formed of a material having a flat washer shape or funnel-like washer shape, for example, is used instead of the cutting work into the L-shaped section, and formed into the L-shaped section by mold clamping, problems such as the slippage of the forming position, the insufficient pressurization of the thread groove 303b caused by the consumption of the pressure for forming it for the formation of the L-shaped section, and the like must be taken into consideration in this case, because the second sealing member 303 is energized to the reinforcing ring 301 and the male screw portion 404a of the core 404 through the rubber material 302'.

The mold is then clamped as shown in FIG. 26b followed by heating and pressurization. The rubber material 302' is fluidized within the cavity 420, carried along the surfaces of the second sealing lip 303a of the second sealing member 303 and the reinforcing ring 301, and spread to the whole area within the cavity 420.

The second sealing lip 303a of the second sealing member 303 softened by heat is then pressed onto the surface of the male screw portion 404a by the pressure of the fluidized rubber material 302' to form the thread groove 303b corresponding to the male screw portion 404a.

After the completion of the vulcanization forming, the mold is opened to take out a molding, and the excessive portion of the first sealing member 302 is properly cut, thereby completing the sealing apparatus 300.

In such a conventional method, however, the sealing apparatus 300 having the composite sealing portion as described above requires a special consideration with respect to the bonding of each constituting element manufactured from different materials.

Namely, the second sealing member 303 formed of a resin material such as PTFE is generally poor in bonding property with other materials, and the bonding surface with a rubber-like elastic body, for example, is often relatively easily peeled by the addition of an external force although it seems to be closely adhered thereto by vulcanization forming, or when the sealing lip 303a of the second sealing member 303 is radially extended in order to insert a shaft thereto, the peeling is likely to progress also from the portion with the reinforcing ring 301 by the addition of a large stress to the second sealing member 303.

Thus, the second sealing member 303 is subjected to a surface treatment by applying an adhesive followed by baking, so that the bonding strength with the first sealing member 302 and the reinforcing ring 301 in vulcanization forming is increased to hold the sealing performance.

In the connection with the reinforcing ring 301 formed of a metallic material, a mechanical fitting means (for example, irregularities of the surface or a communicating hole) is provided on the flange portion 301b of the reinforcing ring 301 to improve the bonding strength, but this along makes the sealing performance limited.

The adhering process described above, which generally followed, as the bed treatment of PTFE, a chemical treatment for dipping the second sealing portion in a liquid compound such as metal sodium, and required facilities and materials for the treatment process and an extremely precise process control. This tended to reduce the working efficiency and increase the cost. Further, in recent years, the problem of environmental protection, such as disposal of waste solution, must be taken into consideration.

SUMMARY OF THE INVENTION

This invention has one object to provide a sealing apparatus and a method for manufacturing it in which a sealing portion using a resin material can be firmly fixed without losing the sealing property of the sealing portion, and chemical treatment and adhering process which were necessary in the past can be abolished.

This invention has another object to provide a sealing apparatus of high quality which can be easily manufactured at low cost, and a method of manufacturing it.

A sealing apparatus according to one mode of this invention comprises an annular sealing lip formed of a resin material, a reinforcing ring having a bent section for nipping the peripheral end portion of the annular sealing lip, and a sealing portion formed of a rubber-like elastic material and vulcanization formed integrally with the reinforcing ring and the annular sealing lip.

The annular sealing lip is thus nipped by the reinforcing ring regardless of its material, and laid into a firmly bonded state while holding the sealing property. The sealing property is improved by the sealing portion formed of the rubber-like elastic material.

The annular sealing lip is preferably provided with a thread groove. This leads to an increase in flexibility of the annular sealing lip and, hence, to an improvement in sealing property of the annular sealing lip in the operation of the sealing device and an improvement in working property in the assembling of a shaft or the like into the sealing apparatus.

The annular sealing lip is also preferably formed into a flat washer shape. This shape facilitates the manufacture of the annular sealing lip.

A method of manufacturing a sealing apparatus of this invention comprises the steps of preliminarily integrating a flat washer-shaped annular sealing lip formed of a resin material with a reinforcing ring having a bent section for nipping the peripheral end portion of the annular sealing lip as an assembled member, and installing this assembled member to a mold to subject a sealing portion formed of a rubber-like elastic material to the vulcanization forming.

The above mold is preferably provided with a thread groove forming portion for forming a thread groove on the annular sealing lip, so that the thread groove is simultaneously with the vulcanization forming of the sealing portion.

In another mode of this invention, the sealing apparatus comprises an integrally built-up assembly composed of a first metal ring having an axially extending peripheral portion and a flange portion extending radially inward from the end portion on the sealed fluid side of the peripheral portion, a second ring having an axially extending peripheral portion and a flange portion extending radially inward from the end portion on the sealed fluid side of the peripheral portion, and a resin ring having a resin formed first sealing lip, the inside surface of the peripheral portion of the first metal ring being fitted to the outside surface of the peripheral portion of the second metal ring to nip the base end portion of the resin ring between the flange portion of the first metal ring and the flange portion of the second metal ring; and a rubber-like elastic body formed covering portion composed of at least a peripheral covering portion for covering the outside surface of the first metal ring, a sealed fluid side covering portion for covering the sealed fluid side end surface of the flange portion of the first metal ring, and a second sealing lip portion provided on the sealed fluid side of the first sealing lip portion, which are continuously formed, and the assembly is integrally held by the covering portion.

According to the constitution like this, the complex and expensive caulking process is dispensed with in the manufacturing process since the assembly is integrally held by the covering portion, enabling the simplification and reduction in cost of the manufacturing process. Since the generation of powder or metal powder from the metal surface treatment coat by the caulking process is thus eliminated, the quality is improved without losing the sealing property by the adhesion as foreign matter of the powder to the sealing apparatus. The quality is further improved since the problem of the rusting by breakage of the metal surface treatment coat in the caulking process never occurs.

Since the covering portion is continuously formed, the passage of airtight leak which is generated in building of the assembly is sealed by the covering portion, and the reliability is improved. Further, the continuous formation of the covering portion dispenses with the complete quality control for foreign matter, flaw, forming failure and assembling failure which might lose the airtightness with respect to each member of the assembly. Thus, the manufacturing process is simplified, enabling a reduction in cost.

Since the outside surface of the first metal ring is covered with the peripheral covering portion formed of a rubber-like elastic body, the sealing function on the peripheral side can be sufficiently ensured without the metal surface damaging the inside surface of the housing to affect the sealing property, and the functional reliability is improved.

In further another mode of this invention, the resin ring is assembled onto the anti-sealed fluid side of the flange portion of the first metal ring in the inner portion of the first metal ring, the second metal ring is press-fitted into the anti-sealed fluid side of the resin ring in the inner portion of the first metal ring to fit the inside surface of the peripheral portion of the first metal ring to the outside surface of the peripheral portion of the second metal ring, and the base end portion of the resin ring is nipped between the flange portion of the first metal ring and the flange portion of the second metal ring, thereby integrally building the assembly, and the covering portion is formed integrally with the assembly arranged within a mold by vulcanization forming.

According to the constitution like this, the complicated and expensive caulking process is dispensed with since the assembly is held by the covering portion formed integrally with the assembly, enabling the simplification and reduction in cost of the manufacturing process. Since the generation of powder or metal powder from the metal surface treatment coat by the caulking process is thus eliminated, the quality is improved without losing the sealing function by the adhesion as foreign matter of the powder to the sealing apparatus. The quality is further improved since the problem of the rusting by breakage of the metal surface treatment coat in the caulking process never occurs.

Since the rubber-like elastic body material is penetrated and filled into the clearance of each member of the assembly, in the process of vulcanization forming, to seal the clearance which forms the passage of airtight leak, the reliability is improved. Further, the continuous formation of the covering portion dispenses with the complete quality control for foreign matter, flaw, forming failure and assembling failure which might lose the airtightness with respect to each member. Thus, the manufacturing process is simplified, enabling a reduction in cost.

BRIEF DESCRIPTION OF THE DRAWINGS

FIG. 13b is a sectional view showing the assembled state of the metal ring portion shown in FIG. 13a.

DESCRIPTION OF THE EMBODIMENTS

This invention is further illustrated in reference to Examples 1 to 7.

EXAMPLES 1–2

Figure 1:
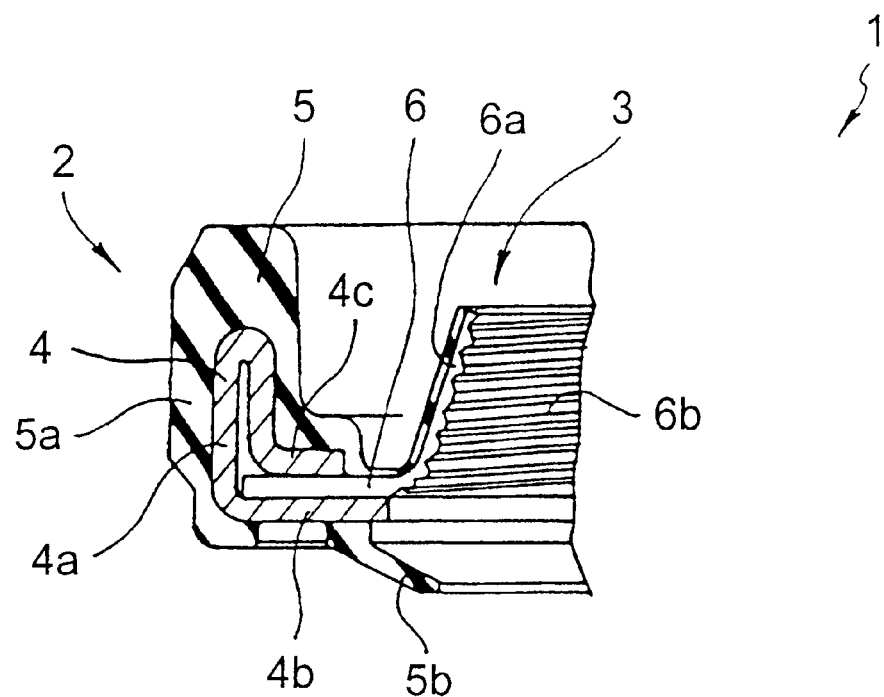
FIG. 1 is a sectional view of a sealing apparatus relating to Example 1 of this invention.

FIG. 1 is a sectional view showing a sealing apparatus 1 to which this invention is applied. This sealing apparatus 1 has an annular form to be arranged in the clearance between a housing and a shaft which are not shown, and comprises a fitting portion 2 to be fitted to the inner periphery of a housing on the outer ring side; and a sealing lip portion 3 for sealing the sliding surface of a moving shaft on the inner ring side.

The fitting portion 2, which fixes the sealing apparatus 1 onto the inner periphery of the housing and holds the sealing property, has fitting rigidity imparted by a metallic reinforcing ring 4, and the peripheral sealing portion 5a of a sealing portion 5 formed of a rubber-like elastic material is integrally formed on the outer ring portion 4a of the reinforcing ring 4.

The sealing lip portion 3 is provided with a flat washer-shaped annular sealing lip 6 using PTFE resin (ethylene tetrafluoride) as resin material and a dust lip 5b integrally formed as a part of the sealing portion 5, these lips forming a composite lip formed of different materials.

The annular sealing lip 6 is firmly nipped by caulking its peripheral end portion by a flange portion 4b extending radially inward from one end of the outer ring portion 4a which is the bent section of the reinforcing ring 4 and a pressure contact end 4c bent and extended from the other end of the outer ring portion 4a so as to be opposite to the flange portion 4b, and a thread groove 6b is formed on a contact surface 6a making contact with the sliding surface of the shaft not shown.

In the sealing apparatus 1 having such a structure, a problem such that the peeling of the annular sealing lip 6 from the reinforcing ring 4 is solved since the annular sealing lip 6 is firmly nipped by the reinforcing ring 4 without depending on adhering process.

Even when the bonding surfaces of the annular sealing lip 6 and the sealing portion 5 are peeled, it never becomes a fatal problem in the using state of the sealing apparatus since the sealing property is never reduced, nor the annular sealing lip 6 is slipped or deformed, and the performance of the sealing portion can be kept.

The thread groove 6b and the dust lip 5b have the same effects as those in the prior arts.

Figure 2:
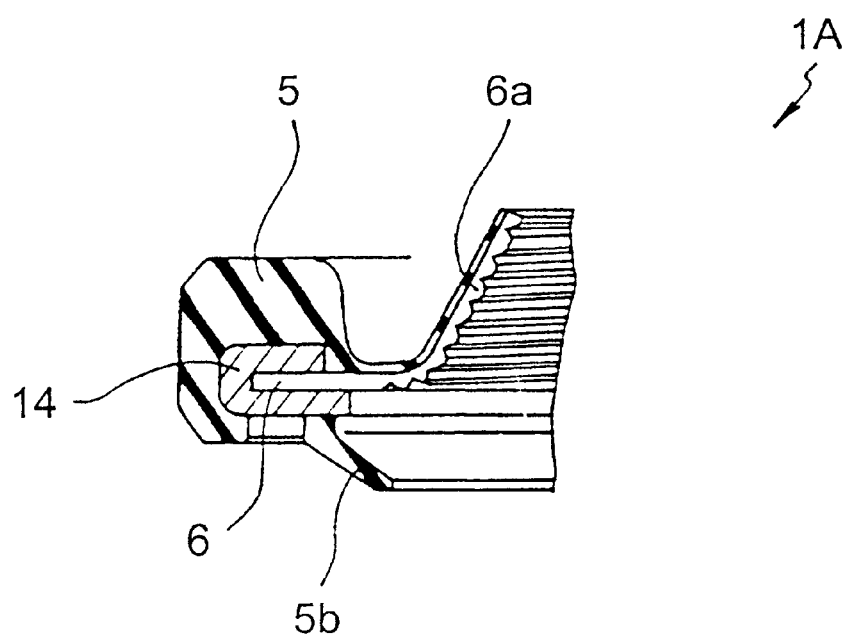
FIG. 2 is a sectional view of a sealing apparatus relating to Example 2 of this invention.

In a sealing apparatus 1A shown in FIG. 2, a reinforcing ring 14 has the simplest bent sectional form, or substantially U-shape. Other constituting parts and effects are the same as those of the sealing apparatus 1 described above, and the same reference numerals are imparted thereto to omit the description.

Figure 3:
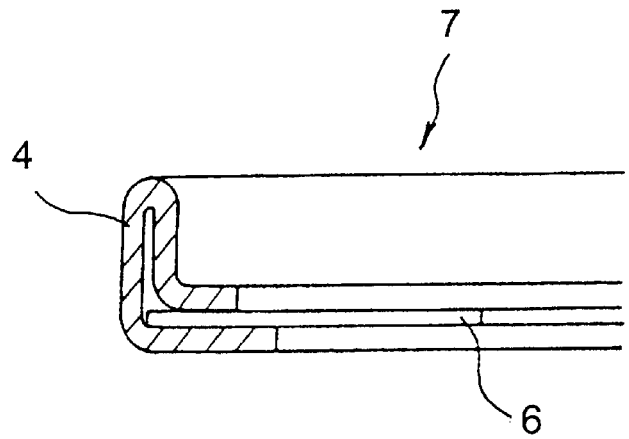
FIG. 3 is a view showing a press-formed assembled state of members.
Figure 4A:
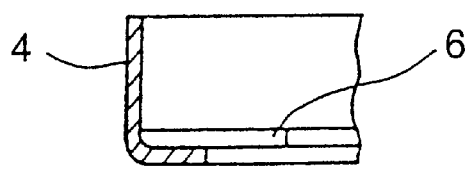
FIGS. 4a to 4d are views illustrating a pressing process of the assembled member.
Figure 4B:
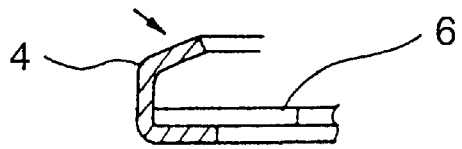
Figure 4C:
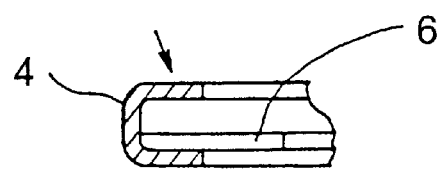
Figure 4D:
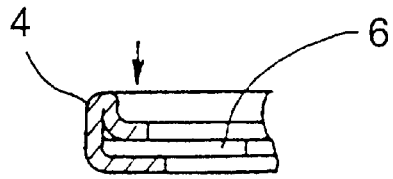

FIG. 3 shows an assembled member 7 formed by preliminarily press-forming the reinforcing ring 4 and the flat washer-shaped annular sealing lip 6. The assembled member 7 can be formed by a pressing process as shown in FIGS. 4a to 4d.

The annular sealing lip 6, which has the flat washer shape, can be easily formed by punching a sheet material or slicing a cylindrical material, and has a merit in cost, compared with an L-shaped sectional one, because of the easiness of manufacture.

Figure 5A:
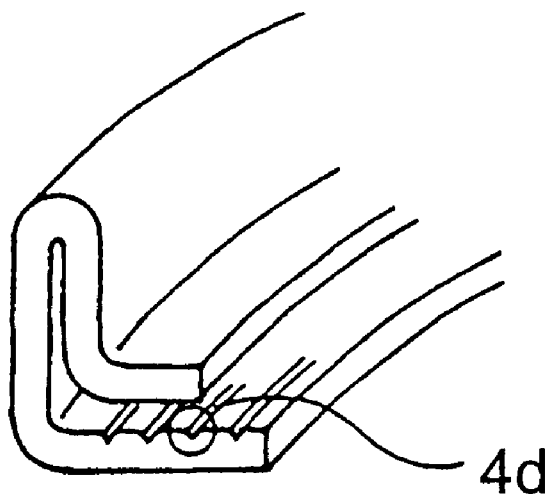
FIGS. 5a to 5c are views illustrating a reinforcing ring with leakproof groove or ridge.
Figure 5B:
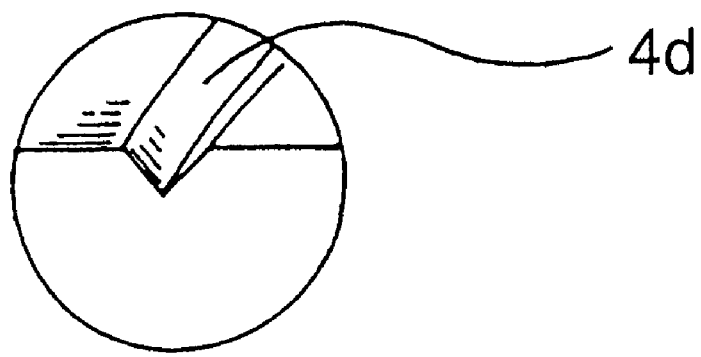
Figure 5C:
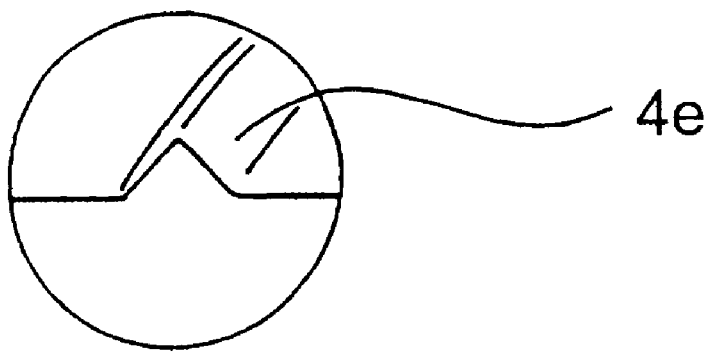

The reinforcing ring 4 can increase the holding force of the annular sealing lip 6 and also improve the sealing property by providing a recessed groove 4d (FIGS. 5a, 5b) or a projection 4e in the portion nipping the annular sealing lip 6. The surface of the reinforcing ring 4 is subjected to a surface roughing or adhesive application to prepare for the forming of the sealing portion 5 formed of a rubber-like elastic material described later, and this can be properly performed before or after the pressing process.

Figure 6:
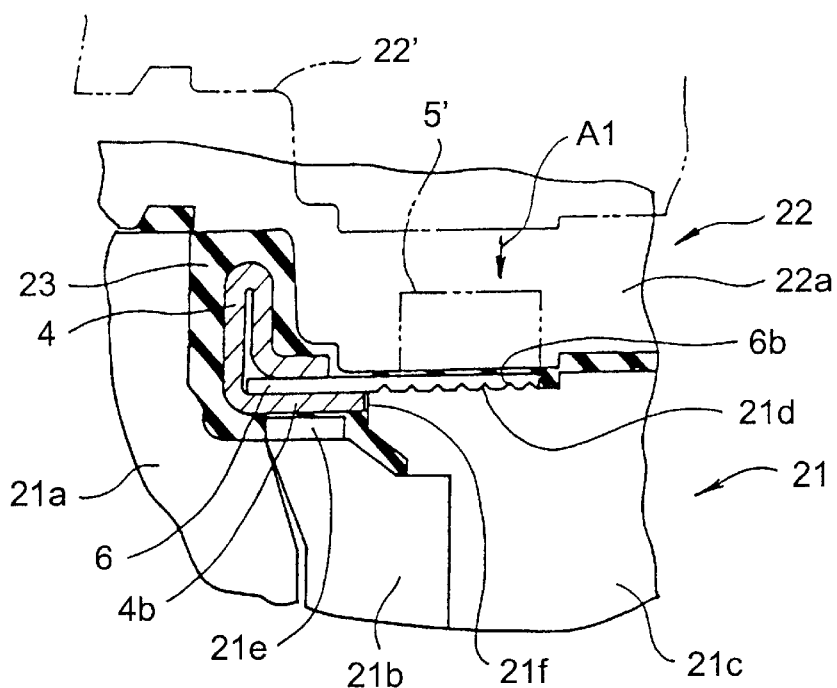
FIG. 6 is a view illustrating a forming process of the sealing apparatus of FIG. 1.

A forming process of the sealing apparatus 1 is illustrated in reference to FIG. 6. As the forming process, vulcanization forming or mold forming is performed depending on the material of the sealing portion 5.

The basic structure of the mold is the same as in the past, which is composed of a lower mold 21 and an upper mold 22. The lower mold 21 is composed of an outer mold 21a forming the radially outer wall surface, a middle mold 21b for holding the assembled member 7, and an inner mold 21c situated in the center portion of the lower mold 21. The inner mold 21c has a thread groove forming portion 21d for forming a thread groove 6b on the contact surface 6a' of the annular sealing lip 6 cut therein.

On the other hand, an annular projecting portion 22a to be inserted to the lower mold 21 is formed on the lower surface of the upper mold 22. When the mold is clamped, an annular cavity 23 is formed between the projecting portion 22a and the lower mold 21.

The forming process of the sealing apparatus is as follows. The mold is opened to install the assembled member 7 described above to the middle mold 21b of the lower mold 21. The reinforcing ring 4 can be positioned with a high precision by bringing the lower surface of its radial portion 4b into contact with the projecting portion 21e of the middle mold 21b, and fitting the radially inner end portion of the flange portion 4b to the radially outer end portion 21f of the inner mold 21c.

A rubber material 5' as the material of the sealing portion 5 which is fluidized, spread and filled in the cavity 23 in the formation is placed in a prescribed position.

An upper mold 22' (two-dot chain line) in the opened state is closed in the direction of an arrow A1 followed by heating and pressurization. In the formation, the thread groove 6b is formed on the contact surface 6a of the annular sealing lip 6 softened by heat by the pressure of the rubber material 5'. After the formation is finished, the mold is opened to take out a molding, and the excessive portion and burr of the sealing portion 5 are properly cut, thereby completing the sealing apparatus.

In this forming process, it is not necessary to mind the relative positional relation between the mold and the annular sealing lip 6, and if only the position of the reinforcing ring 4 is determined, the position of the annular sealing lip 6 is naturally determined. Since the annular sealing lip 6 has a flat form, the addition of pressure in the formation is facilitated, and the thread groove 6b can be formed with good forming property.

Figure 7:
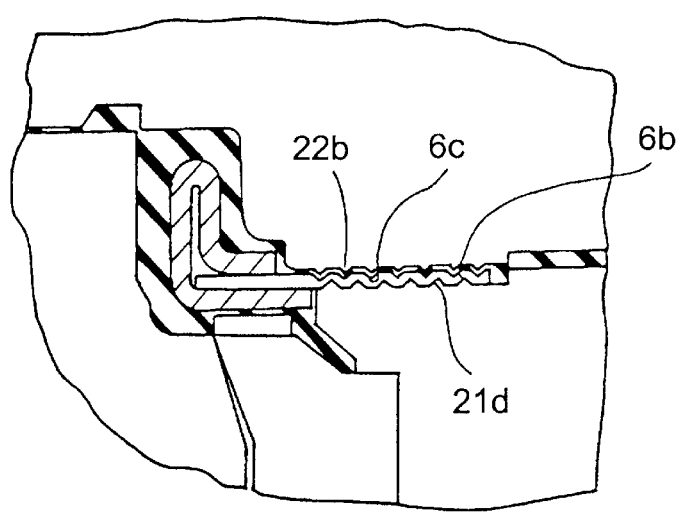
FIG. 7 is a view illustrating another forming process of the sealing apparatus of FIG. 1 with grooves.

Although the thread groove 6b is formed only on the contact surface 6a side with a shaft in FIG. 6, it can be also formed on both surfaces in order to increase the flexibility of the annular sealing lip 6, and an example of this structure is shown in FIG. 7. Denoted at 6c is a thread groove formed on the surface opposite to the contact surface 6a of the annular sealing lip 6. The thread groove 6c is formed by a thread groove forming portion 22b formed on the annular projecting portion 22a of the upper mold 22, but a plurality of concentric circular grooves may be adapted instead of the thread groove since no pumping effect is intended.

When the screw thread is provided on both the surfaces, the flexibility of the annular sealing lip 6 is increased to improve the following property to off-centering of a shaft, and the heat generation or wear is reduced when the fastening force is reduced, enabling an extension in life.

Figure 8A:
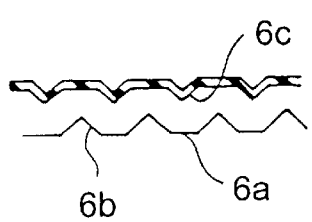
FIGS. 8a and 8b are views showing examples of sectional form of a thread groove.
Figure 8B:
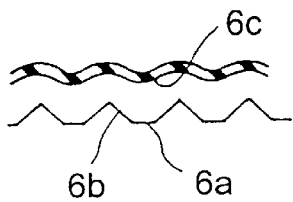

FIGS. 8a and 8b show examples of sectional forms of screw grooves 6b and 6c, wherein mountain form and corrugated form are given.

Figure 9A:
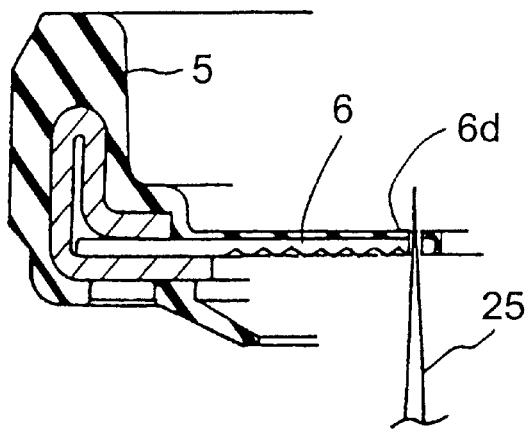
FIGS. 9a to 9c are views illustrating finishing methods of the radially inner end portion of an annular sealing lip.
Figure 9B:
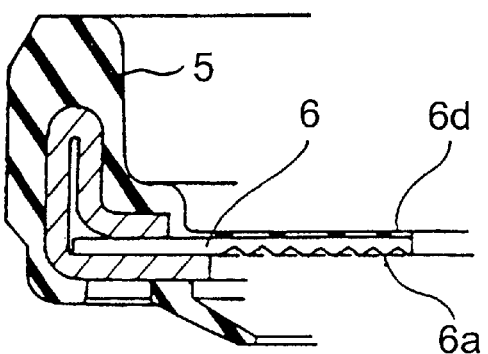
Figure 9C:
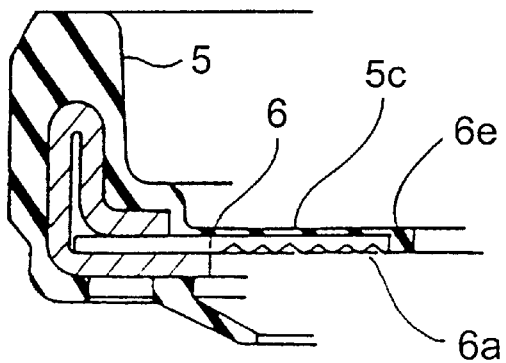

FIGS. 9a to 9c are views illustrating finishing methods of the radially inner end portion 6d of the annular sealing lip 6 of the sealing apparatus 1 taken out from the mold. The excessive portion or burr of the sealing portion 5 can be removed from the radially inner end portion 6d by cutting work with a cutting edge 25 as shown in FIG. 9a. The radially inner end portion 6d may be shet so that the rubber-like elastic member is never exposed to the contact surface 6a side of the radially inner end portion 6d as shown in FIG. 9b, or the rubber-like elastic member 6e may be left as shown in FIG. 9c so that the rubber-like elastic member 6e makes contact with the sliding surface of the shaft in about 0.5 mm to 2.0 mm, for example, of the tip portion of the annular sealing lip 6.

Figure 25:
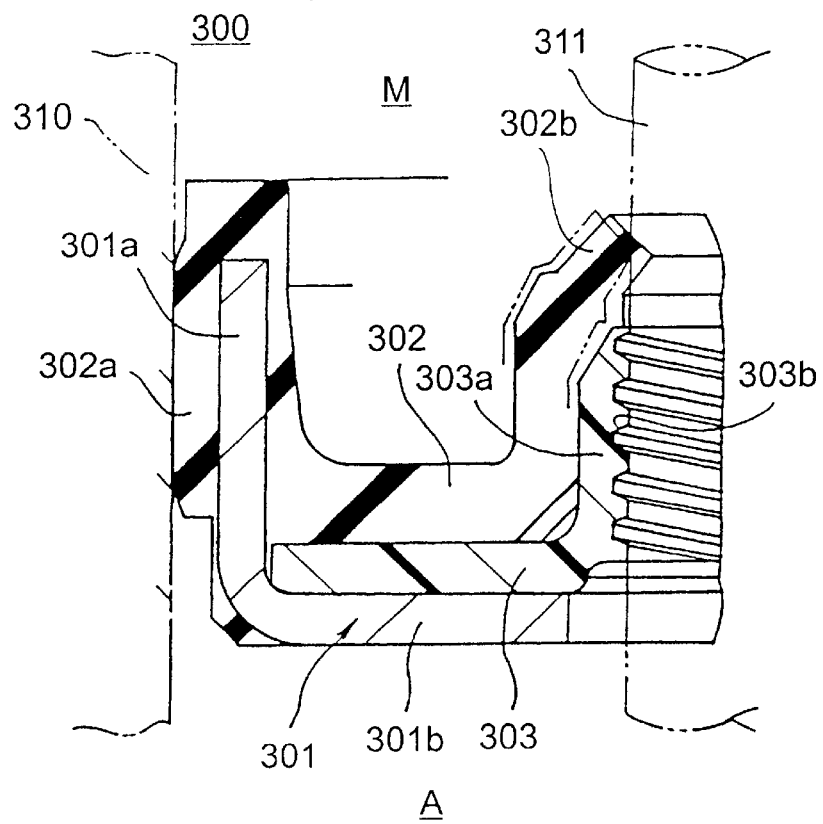
FIG. 25 is a sectional view showing further another conventional sealing apparatus.
Figure 26A:
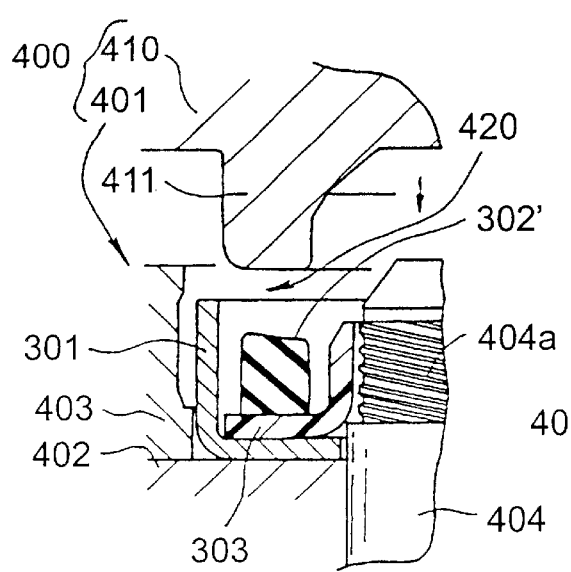
FIGS. 26a and 26b are views illustrating methods of forming the conventional sealing apparatus of FIG. 25.
Figure 26B:
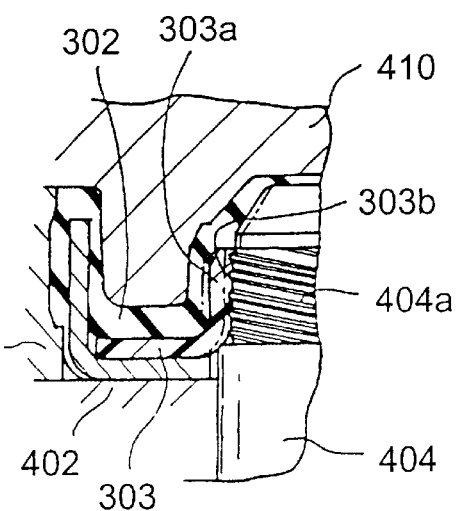

When this invention is applied to a sealing apparatus having a first sealing lip 302b arranged on the tip portion of the second sealing member 303 as the sealing apparatus 300 of FIG. 25 in the description of prior arts, the rubber-like elastic member 6e should be made into lip form. At that time, the thickness of the radial portion 5c of the sealing portion 5 thinly formed on the upper side in the drawing of the annular sealing lip 6 is increased, whereby the fastening force can be imparted to the lip in use.

Figure 10:
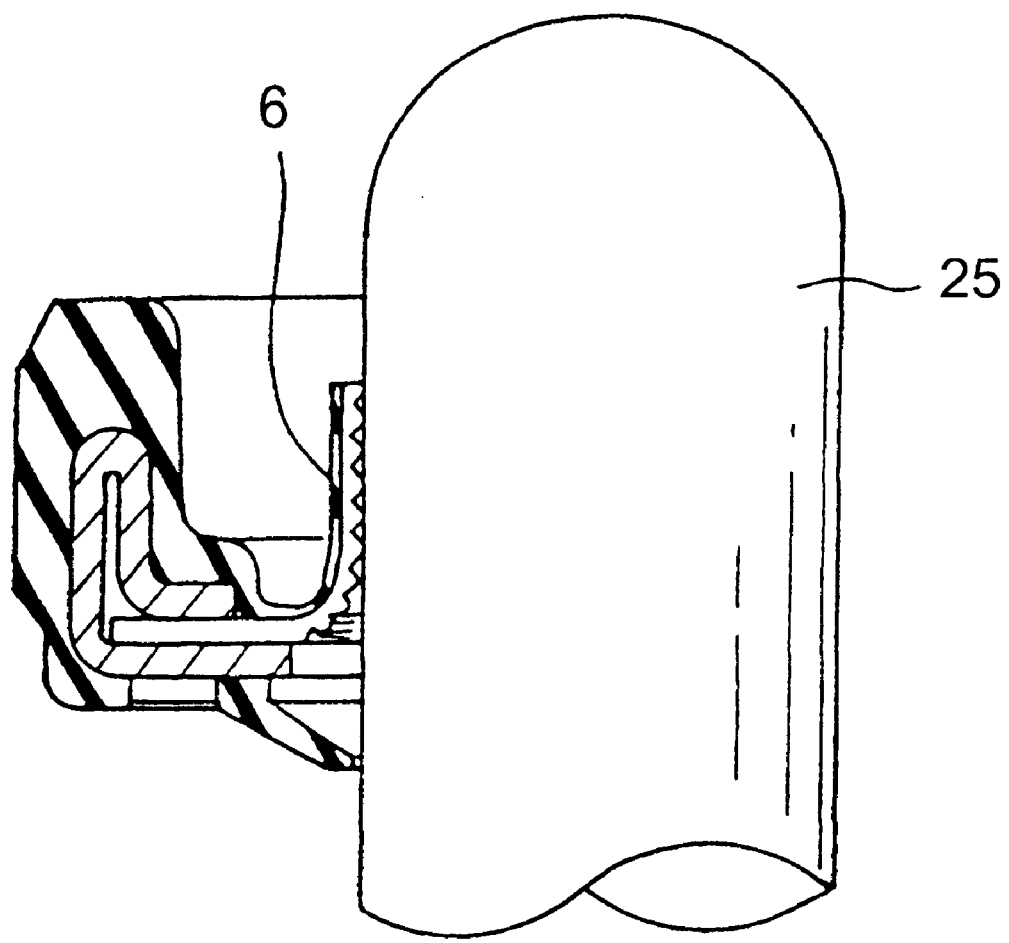
FIG. 10 is a view showing a state during bending of the annular sealing lip.

FIG. 10 is a view showing a state during preliminary bending of the annular sealing lip 6 in order to facilitate the assembling of the sealing apparatus 1 into an associated device. Denoted at 25 is a bending jig for a lip, which has substantially the same diameter as the shaft of the device to be inserted to the sealing apparatus 1. Heating is carried out with the insertion of this bending jig 25 to bend the annular sealing lip 6.

Although the annular sealing lip 6 may be bent by the shaft of the device simultaneously with the assembling into the device instead of the preliminary bending, this method is not preferred because the fastening force of the annular sealing lip 6 is difficult to adjust and the annular sealing lip 6 might be damaged according to the assembling.

Further, it is also considered to dispense with the bending by changing the form of the mold in FIG. 6 and forming the annular sealing lip 6 with a certain degree of bending in the formation.

According to this invention illustrated in reference to Examples 1 and 2, the fixation of the annular sealing lip requires no chemical treatment or adhering process since the annular sealing lip formed of a resin material can be mechanically firmly fixed to the sealing apparatus by the reinforcing ring regardless of its material.

Even if the bonding surfaces of the annular sealing lip and the sealing portion are peeled, the sealing property can be kept.

The annular sealing lip is provided with the thread groove, whereby the flexibility of the annular sealing lip is enhanced to improve the sealing property of the annular sealing lip in the operation of the sealing apparatus, and the working property in the assembling of a shaft or the like to the sealing apparatus is also improved.

By setting the annular sealing lip to the flat washer shape, the annular sealing lip can be easily manufactured at low cost, and the forming property in the thread groove formation is also enhanced.

EXAMPLE 3

Figure 11:
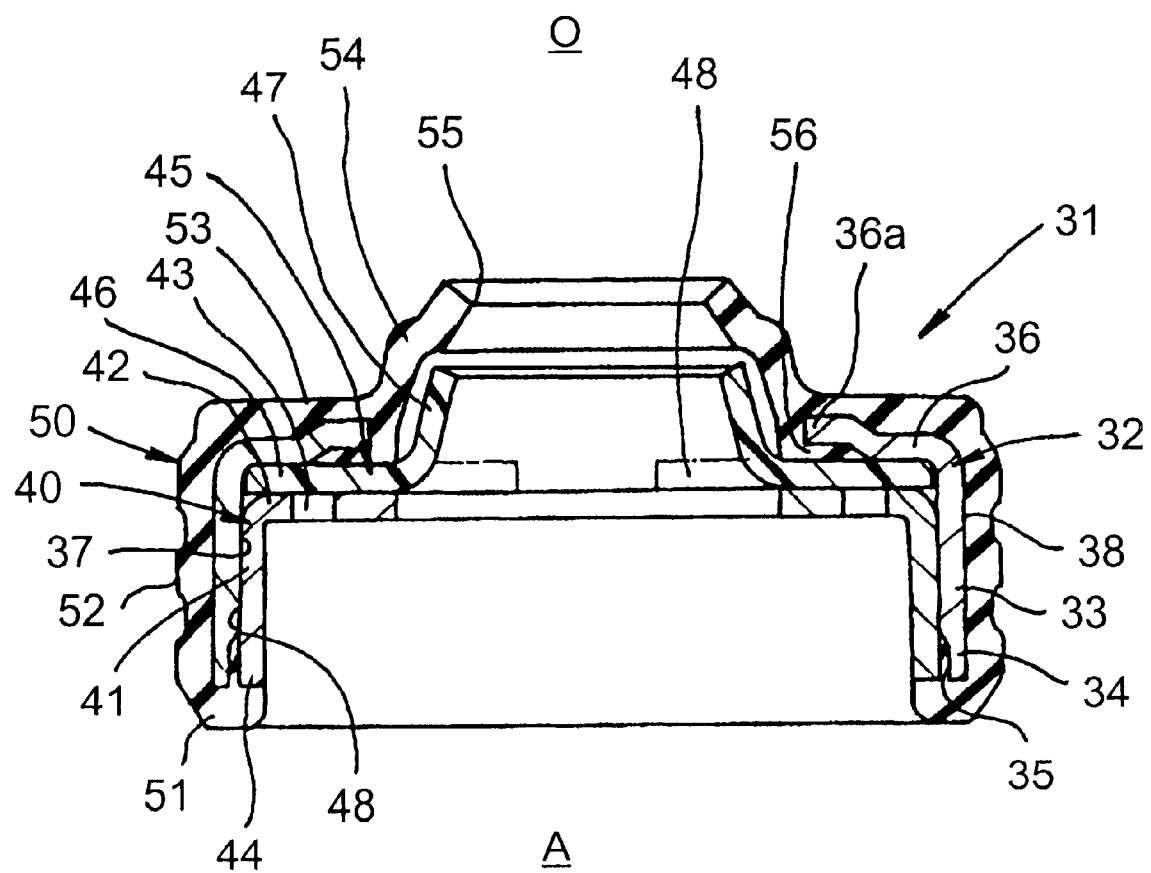
FIG. 11 is a sectional view Showing the essential parts of a sealing apparatus relating to Example 3 of this invention.

FIG. 11 is a sectional view showing the essential parts of a sealing apparatus relating to Example 3 of this invention.

A metal ring 32 as the first metal ring of the sealing apparatus 31 is composed of an axially extending peripheral portion 33 having a substantially L-shaped section; an axial end portion 34 of the peripheral portion having a stepped portion 35 formed by chamfering on the inside surface side; a flange portion 36 extending radially inward from the end portion on the sealed fluid side O of the peripheral portion 33; and an inner circumferential portion 36a formed on the sealed fluid side O on the radially inside of the flange portion 36 through the stepped portion.

A metal ring 40 as te inside second metal ring of the metal ring 32 is composed of an axially extending peripheral portion 41 having a substantially L-shaped section and a flange portion 42 extending radially inward from the sealed fluid side O of the peripheral portion, and the flange portion 42 has a plurality of axial holes 43.

The inside surface 37 of the peripheral portion 33 of the metal ring 2 is fitted to the outside surface 48 of the peripheral portion 41 of the metal ring 40, and a sealing lip support portion 47 as the radially outer base end portion of a PTFE formed annular sealing member 45 as a resin ring is nipped between the flange portions 36, 42 of the metal rings 32, 40. A sealing lip portion 47 as a first sealing lip portion axially extending on the sealed fluid side O is formed on the radially inner end portion of the sealing lip support portion 47, and it slides on the shaft to seal it. Thus, the assembly is formed by the metal ring 32, the metal ring 40 and the sealing member 45. As the resin, PTFE is desirably used from the viewpoint of characteristics such as chemical resistance, heat resistance and low frictional coefficient, but pure ones or those having various fillers added thereto may be also used according to characteristics.

A rubber formed covering portion 50 is composed of an axial end portion 51 for covering the atmospheric side A axial end portions 34, 44 of the metal rings 32, 40 extending from the outside surface 38 side of the peripheral portion 33 of the metal ring 32 to the inside surface side corner portion of the peripheral portion 41 of the metal ring 40; a peripheral fitting portion 52 as a peripheral covering portion for covering the whole outside surface 38 of the peripheral portion 33 of the metal ring 32; a wall portion 53 as a sealed fluid side O covering portion for covering the sealed fluid side O end surface of the flange portion 36 of the metal ring 32; a sealing lip portion 54 as a second sealing lip portion axially extending to the sealed fluid side O; a lip tip portion 55 sliding on the shaft to seal it; and a bonding airtight portion 56 for filling the space between the sealing lip support portion 47 of the sealing member 45 and the inner circumferential portion 36a of the flange portion 36 of the metal ring 32, and each portion is continuously formed. In this example, rubber is used as rubber-like elastic body, but this invention is never limited thereby.

The covering portion 50 is baked integrally with the metal rings 32, 40 and the sealing member 45 by vulcanization forming. The axial end portion 51 enters the space formed between the stepped portion 35 of the peripheral portion 33 of the metal ring 32 and the metal ring 40 to hold the atmospheric side A end portion of the metal ring 32 and the metal ring 40, the bonding airtight portion 56 enters between the inner circumferential portion 36a of the metal ring 32 and the sealing lip support portion 47 of the sealing member 45 to hold the sealing lip support portion 47, and the continuously formed covering portion 50 integrally holds the metal rings 32, 40 and the sealing member 45. Thus, no powder or metal powder is generated from the metal surface treatment coat since the caulking process is dispensed with, nor the sealing function is lost by the adhesion as foreign matter of the powder to the sealing apparatus, and the quality is improved. Further, since the problem of the rusting by breakage of the metal surface treatment coat in the caulking process never occurs, the quality is improved.

The passage of airtight leak generated in the assembling of the metal ring 32, the metal ring 50 and the sealing member 45 is sealed by the covering portion 50 since the covering portion 50 is continuously formed, and the reliability is improved. Further, the continuous formation of the covering portion 50 to the metal rings 32, 40 and the sealing member 45 dispenses with the complete quality control for foreign matter, flaw, forming failure and assembling failure which might lose the airtightness with respect to each member. Thus, the manufacturing process is simplified, enabling a reduction in cost.

The sealing lip portion 47 of the sealing portion 45 is formed, as described later, by bending the radially inner portion of the flat washer-shaped sealing member 45 in the same direction as the sealing lip portion 54 of the covering portion 50 after vulcanization forming.

Figure 12:
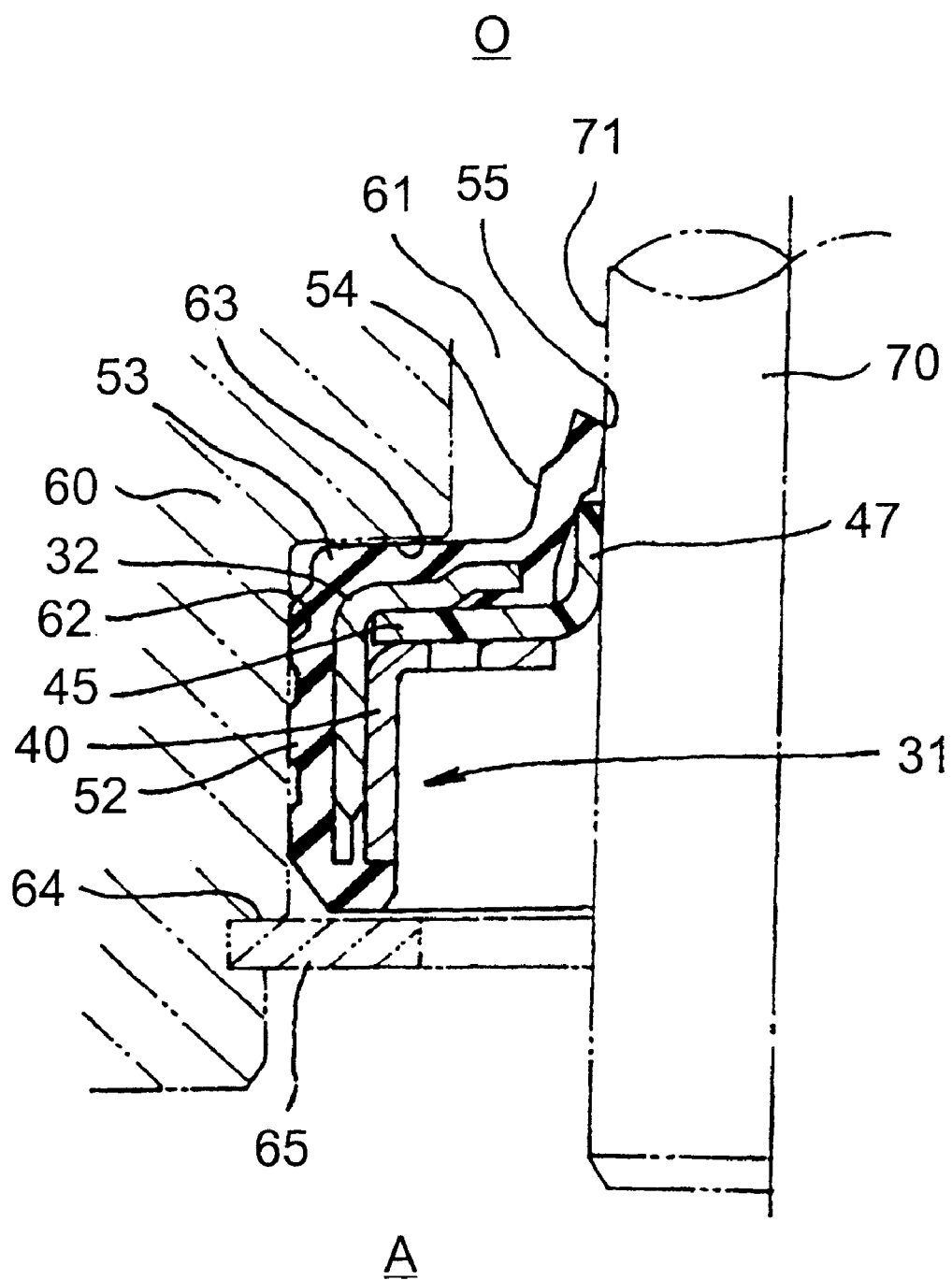
FIG. 12 is a sectional view showing the mounted state of the sealing apparatus relating to Example 3 of this invention.

FIG. 12 is a sectional view showing the mounted state of the sealing apparatus 31 onto the housing on fixed side.

The peripheral fitting portion 52 of the covering portion 50 of the sealing apparatus 31 is fitted to the inside surface 32 of the shaft hole 61 of a housing 60, and a wall portion 53 is fixed in contact with the stepped portion end surface 63 of the housing 60. The inside surface 62 of the shaft hole 61 of the atmospheric side A housing 60 of the sealing apparatus 31 has a groove 64, and a stop ring 65 for preventing the separation of the sealing apparatus 31 is installed thereto.

Since the peripheral fitting portion 52 for covering the whole outside surface 38 of the peripheral portion 33 of the metal ring 32 is formed, the metal surface is prevented from damaging the inside surface 62 of the housing 60 to affect the sealing property, and the sealing function on the peripheral side can be sufficiently ensured to improve the functional reliability.

A shaft 70 is concentrically inserted to the inner periphery of the sealing apparatus 31 in such a manner as to be rotatable. The lip portion 55 of the sealing lip portion 54 of the covering portion 50 and the sealing lip portion 47 of the sealing member 45 slide on the outside surface 71 of the shaft 70 to seal it.

A method for manufacturing the sealing apparatus 31 is then illustrated in reference to FIGS. 11–12.

Figure 13A:
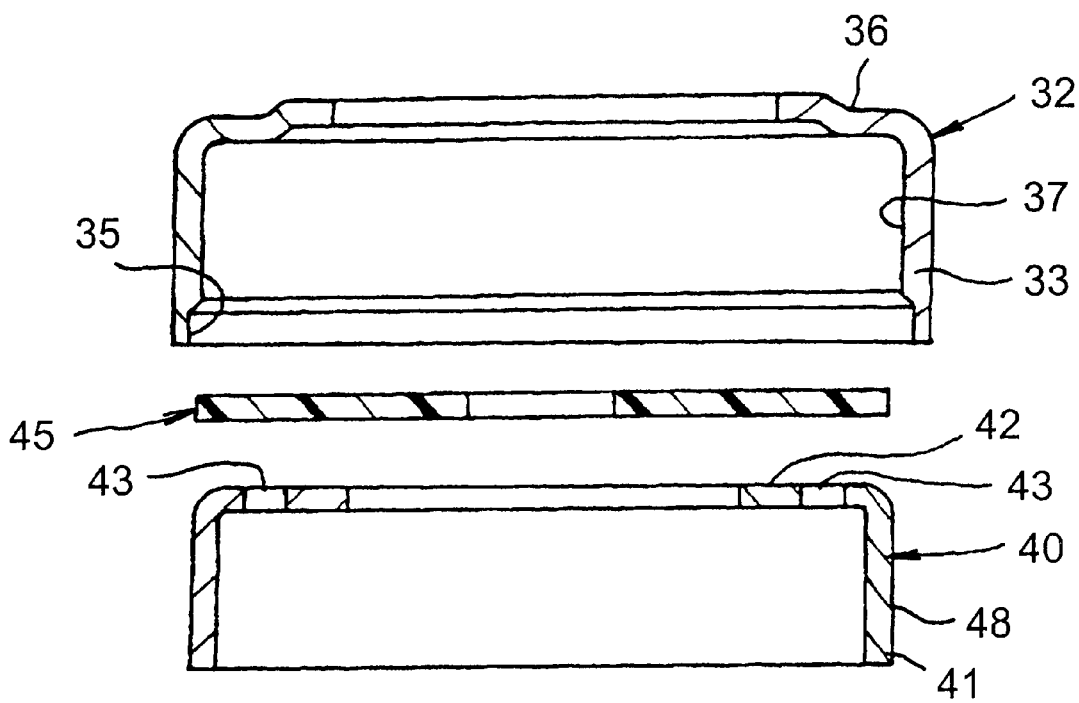
FIG. 13a is a sectional view showing the state before assembling of the metal ring portion of the sealing apparatus relating to Example 3 of this invention.

Each member before assembling is shown in FIG. 13a. The flat washer-shaped sealing member 45 is inserted to the flange 36 side of the metal ring 32 along the peripheral portion 33, and the sealing member 45 is assembled onto the atmospheric side of the flange portion 36 of the metal ring 32. Further, the metal ring 40 is pressfitted to the radially inner side of the metal ring 32, and the inside surface 37 of the peripheral portion 33 of the metal ring 32 is fitted to the outside surface 48 of the peripheral portion 41 of the metal ring 40. The radially outside of the sealing member 45 is nipped between the flange portions 36, 42 of the two metal rings 32, 40 so as to crimp it, and integrated together. In the assembling, the stepped portion 35 formed on the inside surface of the axial end portion 34 of the metal ring 32 plays a role of guide in the insertion of the sealing member 45 and the metal ring 40.

Figure 13B:
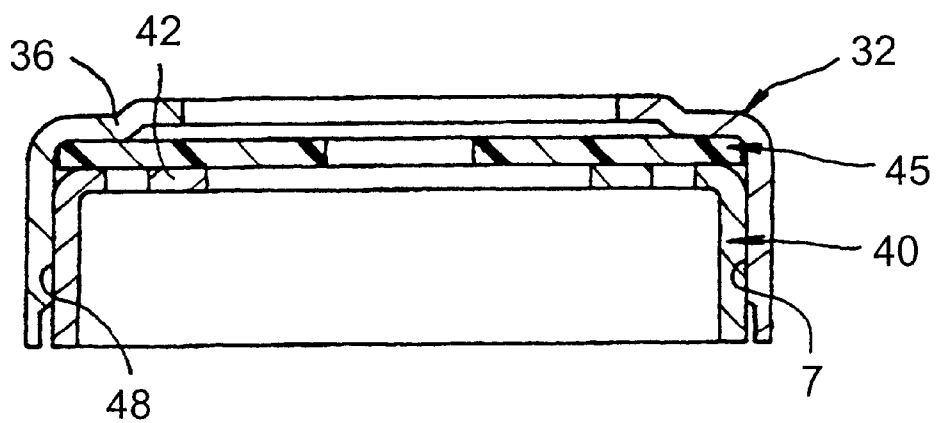

The assembled state is shown in FIG. 13b. After the assembling, the edge portion 44 of an equally arranged hole 43 situated on the flange portion 42 of the metal ring 40 is bitten into the surface of the sealing member 45, thereby playing a role to prevent the sliding after assembling and the corotation with the shaft in operation and firmly fix it.

Both the metal rings 32, 40 are preliminarily surface-treated, in which a chemical coating treatment such as phosphoric acid coat is applied to the bed, and a resin or rubber paste adhesive most suitable for rubber is applied to the surface, so that the rubber covering portion 50 can be formed on the metal rings 32, 40 by vulcanization forming, and also firmly adhered by baking thereto.

Figure 14A:
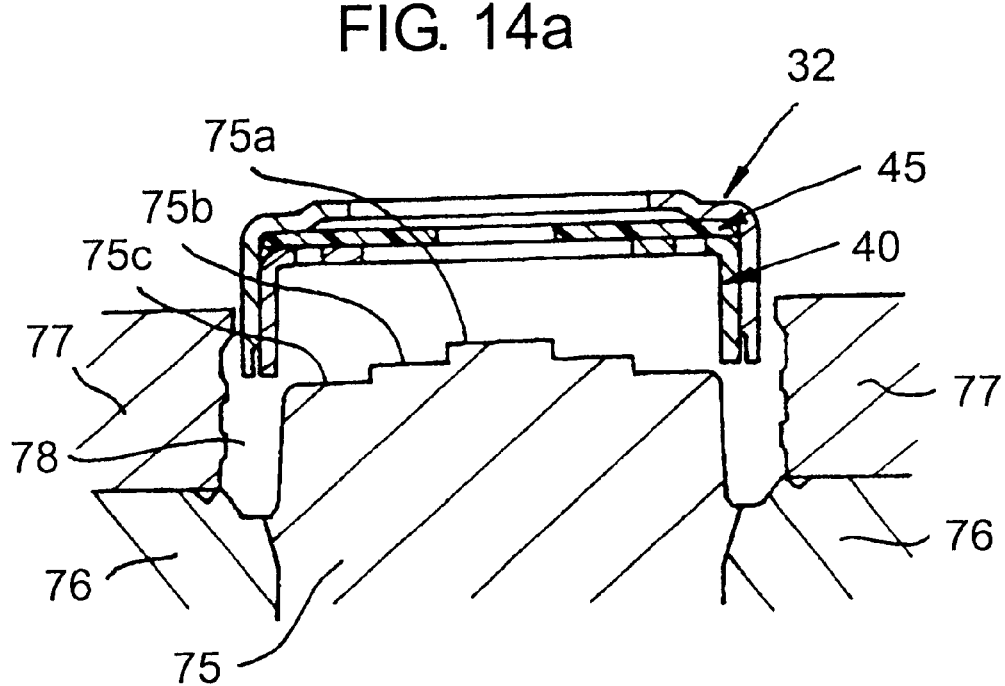
FIGS. 14a and 14b are illustrating a method of manufacturing the sealing apparatus relating to Example 3 of this invention.

As shown in FIG. 14a, the two metal rings 32, 40 and flat washer-shaped sealing member 45 integrated together are set on a first lower mold 75. A projecting portion 75a, a sealing member holding portion 75b, a metal ring holding portion 75c are concentrically formed on the upper surface of the first lower mold 75 in staircase form in the radially outer direction from the center portion, the radially inner portion of the sealing member 45 is held on the sealing member holding portion 75b, and the flange portion 42 of the metal ring 40 is held on the metal ring holding portion 75c. The peripheral portions 33, 41 of the metal rings 32 and the metal ring 40 are inserted to an annular recessed portion 78 formed by the first lower mold 75, the second lower mold 76, and the middle mold 78, and a space is ensured under the axial end portions 34, 44 of the metal ring 32 and the metal ring 40.

Figure 14B:
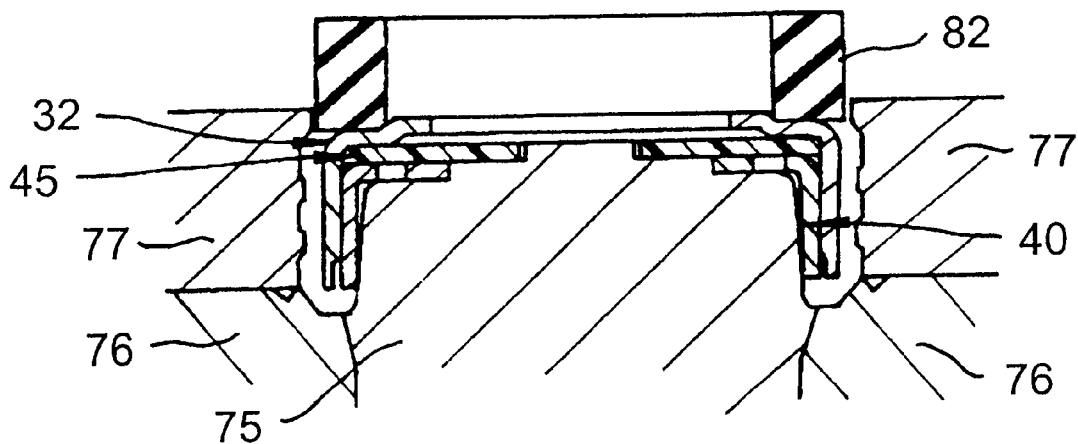

Thereafter, a rubber material 82 annularly cut is put on the upper portion of the flange portion 36 of the metal ring 32 as shown in FIG. 14b, and pressed from above by an upper mold (not shown) to perform compression and vulcanization forming under optimum pressure and temperature conditions, thereby integrally forming the covering portion 50 composed of the axial end portion 51, the peripheral fitting portion 52, the wall portion 53, the sealing lip portion 54, the lip tip portion 55, and the bonding airtight portion 56.

In this process, since the rubber material 82 is penetrated also between the stepped portion 35 of the metal ring 32 and the outside surface 48 of the metal ring 40 and between the inner circumferential portion 46 of the metal ring 32 and the sealed side end surface of the sealing member 45, and filled therein to seal the clearance in the assembled portion between the metal rings 32, 40 and the sealing member 45 which forms the passage of airtight leak, the reliability is improved. The integral formation of the covering portion 50 with the metal rings 32, 40 and the sealing member 45 dispenses with the complete quality control for foreign matter, flaw, forming failure, and assembling failure which might lose the sealing property with respect to each member. Thus, the manufacturing process is simplified, enabling a reduction in cost. Further, since the caulking process is dispensed with, and the generation of powder or metal powder from the metal surface treatment coat is thus eliminated, the quality is improved without losing the sealing function by the adhesion as foreign matter of the powder to the sealing apparatus. The quality is further improved since the problem of the rusting by breakage of the metal surface treatment coat in the caulking process never occurs. The sealing property is never affected by the damage of the associated housing since the whole outside surface 38 of the peripheral portion 33 of the metal ring 32 is covered with the rubber, and the sealing function on the peripheral side can be sufficiently ensured to improve the function reliability.

Figure 15:
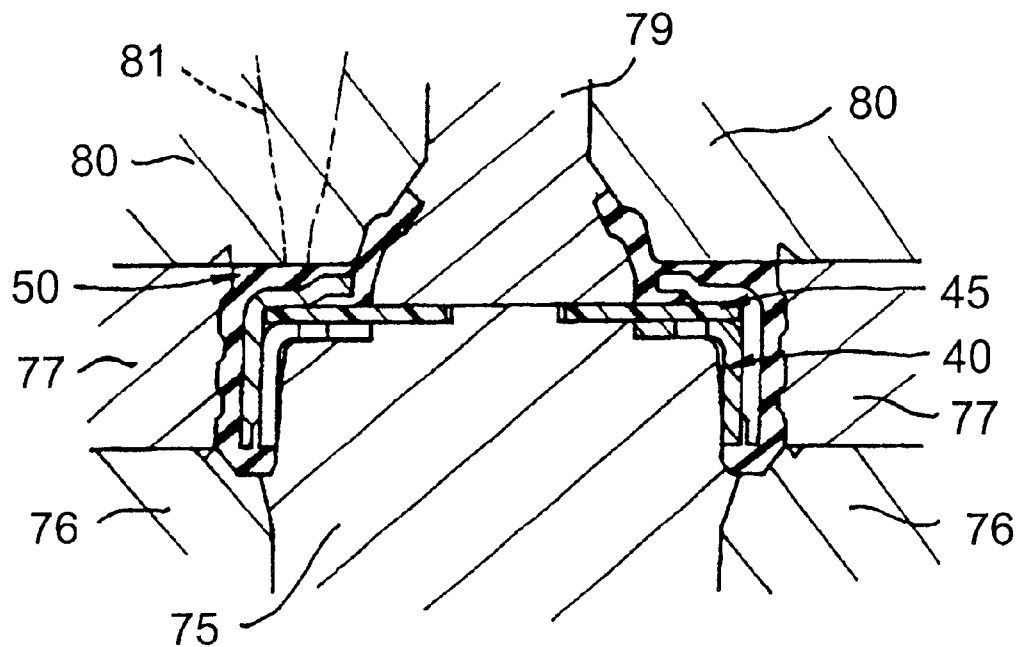
FIG. 15 is a view illustrating another method of manufacturing the sealing apparatus relating to Example 3 of this invention.

In addition to the compression molding described above, the sealing apparatus 31 may be manufactured by clamping the mold by the first upper mold 79 and the second upper mold 80 as shown in FIG. 15 and injection molding the rubber material through injection holes 81 equally arranged on the second upper mold 80.

Figure 16:
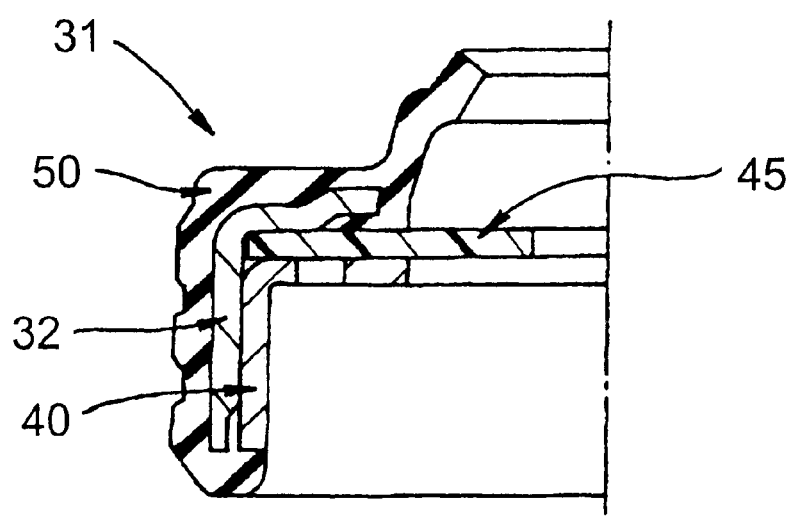
FIG. 16 is a halved sectional view showing the sealing apparatus related to Example 3 of this invention laid in semi-product state.
Figure 17:
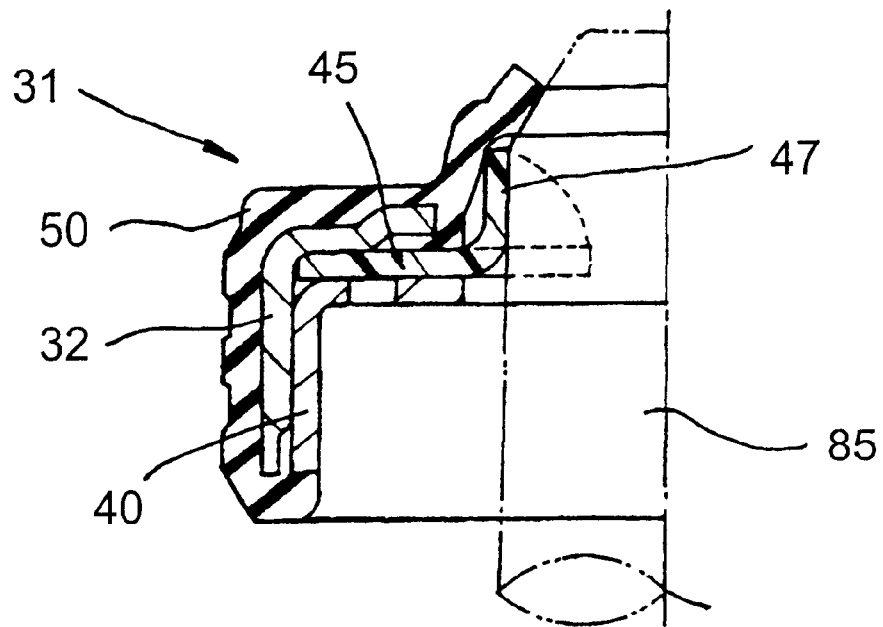
FIG. 17 is a view illustrating a state during bending of the sealing apparatus relating to Example 3 of this invention.

FIG. 16 shows the sealing apparatus 31 in semi-product state just after forming, wherein the sealing member 45 still has the flat washer shape, and subjected to no bonding work. FIG. 17 shows a state where the shaft 85 of a bending jig is inserted to the inside of the sealing member 45 of the sealing apparatus 31 laid in semi-product state to form the sealing lip portion 47 axially extending on the sealed fluid side by bending. A number of products are neatly arranged in a bar form on the shaft, and heated for a fixed time within an electric furnace, whereby stable bent state and dimension can be provided with good productivity.

EXAMPLE 4

Figure 18:
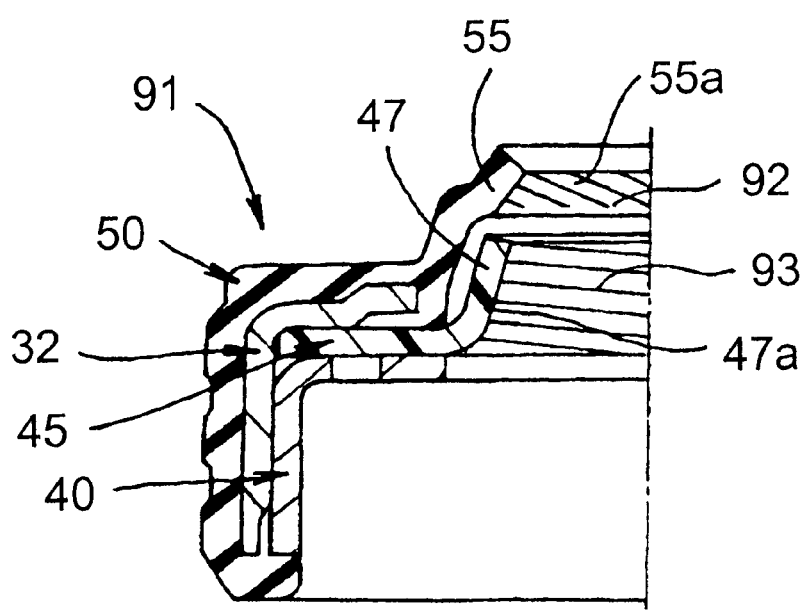
FIG. 18 is a halved sectional view showing the essential parts of a sealing apparatus relating to Example 4 of this invention.

A sealing apparatus 61 relating to Example 4 of this invention is shown in FIG. 18. Since it has the same structure as in Example 3 excluding the structure of the inside surfaces of the sealing lip portion 54 of the covering portion 50 and the sealing lip portion 47 of the sealing member 45, the same reference numerals are used for parts having the same structure to omit the description.

In the sealing apparatus 91, a spiral rib 92 having a substantially rectangular section is equally arranged in the circumferential direction on the inside surface 55a of the lip tip portion 55 of the sealing lip portion 54 of the covering portion 50, and a spiral notched groove 93 is formed on the inside surface 47a of the sealing lip portion 47 of the sealing member 45, whereby such a screw hydrodynamically imparting the sealing effect is added. Thus, the sealing performance can be further improved.

EXAMPLE 5

Figure 19:
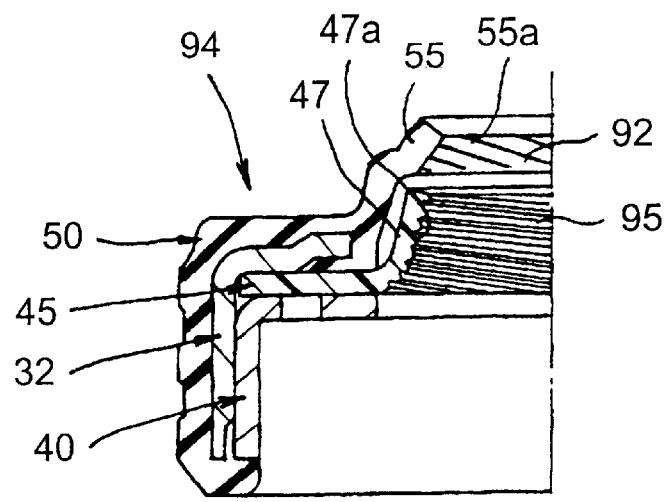
FIG. 19 is a halved sectional view showing the essential parts of a sealing apparatus relating to Example 5 of this invention.
Figure 20:
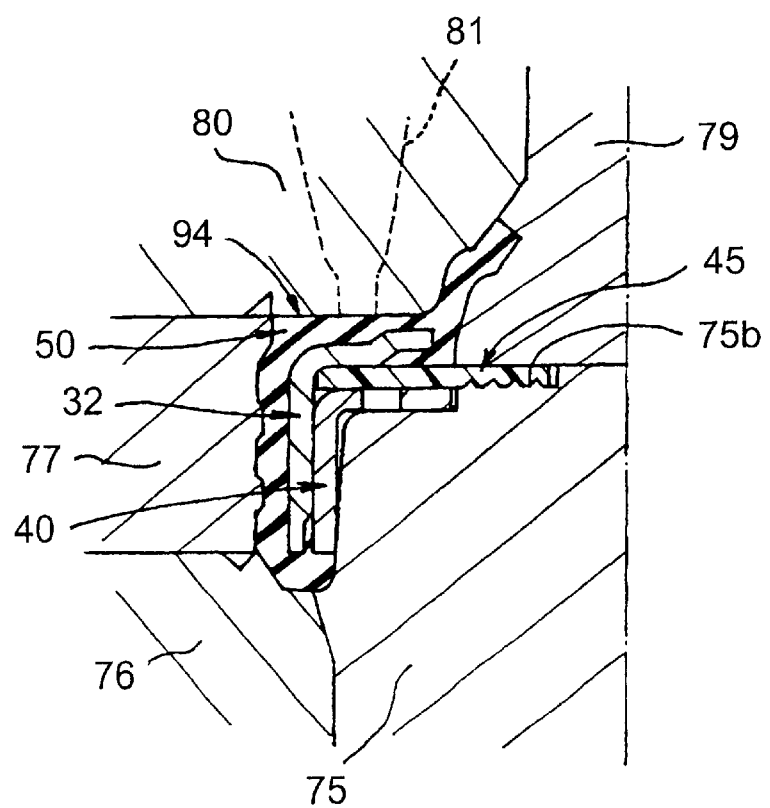
FIG. 20 is a view illustrating a method of manufacturing the sealing apparatus relating to Example 5 of this invention.

A sealing apparatus 94 relating to Example 5 of this invention is shown in FIGS. 19 and 20. Since it has the same structure as in Example 3 excluding the structure of the inside surfaces of the sealing lip portion 54 of the covering portion 50 and the sealing lip portion 47 of the sealing member 45, the same reference numerals are used for parts having the same structure to omit the description.

In the sealing apparatus 94, a substantially rectangular sectional spiral rib 92 is equally arranged in the circumferential direction on the inner peripheral surface 55a of the lip tip portion 55 of the sealing lip portion 54 of the covering portion 50, and a V-shaped sectional spiral groove 95 is equally arranged in circumferential direction on the inside surface 47a of the sealing lip portion 47 of the sealing member 45. Such a screw hydrodynamically imparting the sealing effect is added, whereby the sealing performance can be further improved.

The spiral groove 95 on the inside surface 47a of the sealing lip portion 47 of the sealing portion 45 can be easily formed by forming a protruding screw on the sealing member holding portion 75b of the first lower mold 75 in vulcanization forming, as shown in FIG. 10, and transferring it.

EXAMPLE 6

Figure 21:
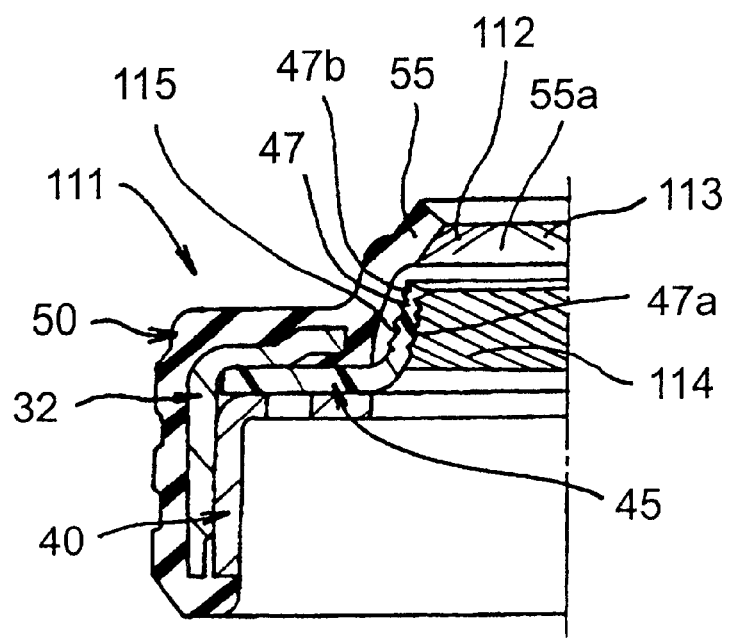
FIG. 21 is a halved sectional view showing the essential parts of a sealing apparatus relating to Example 6 of this invention with grooves on the both faces 84 & 85.

A sealing apparatus 111 relating to Example 6 of this invention is shown in FIG. 21. Since it has the same structure as in Example 3 excluding the structure of the inside surfaces of the sealing lip portion 54 of the covering portion 50 and the sealing lip portion 47 of the sealing member 45, the same reference numerals are used for parts having the same structure to omit the description.

In the sealing apparatus 111, a substantially triangular sectional left-handed spiral rib 112 and right-handed spiral rib 113 are equally arranged in the circumferential direction on the inside surface 55a of the lip tip portion 55 of the sealing lip portion 54 of the covering portion 50, and V-shaped sectional spiral grooves 114, 115 are arranged on the inside surface 47a and outside surface 47b of the sealing lip portion 47 of the sealing member 45. Such screws hydrodynamically imparting the sealing effect are added, whereby the sealing performance can be further improved.

EXAMPLE 7

Figure 22:
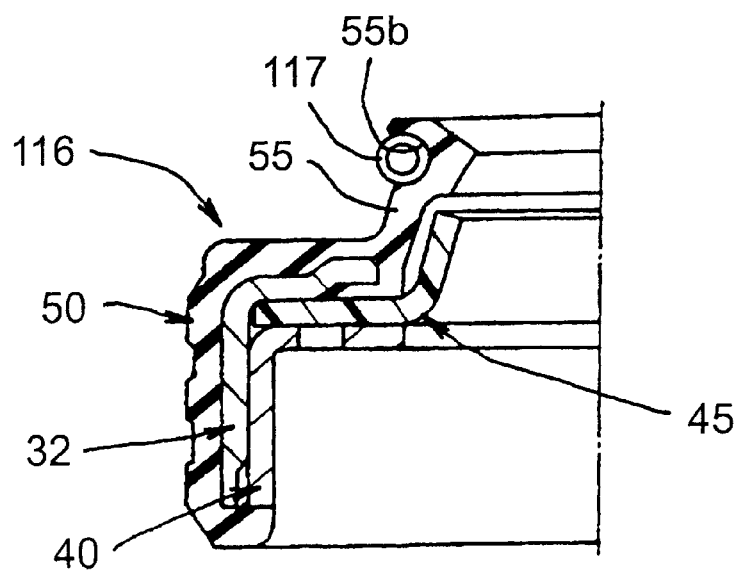
FIG. 22 is a halved sectional view showing the essential parts of a sealing apparatus relating to Example 7 of this invention.
Figure 23:
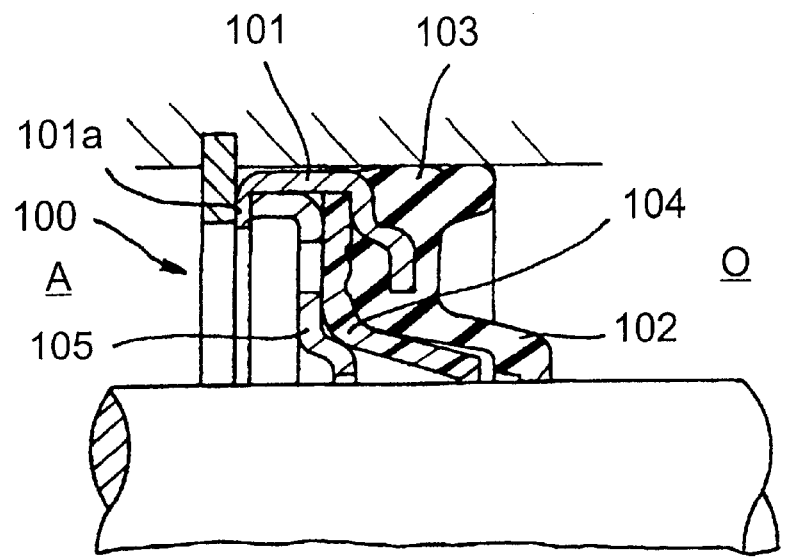
FIG. 23 is a view showing a conventional sealing apparatus.
Figure 24:
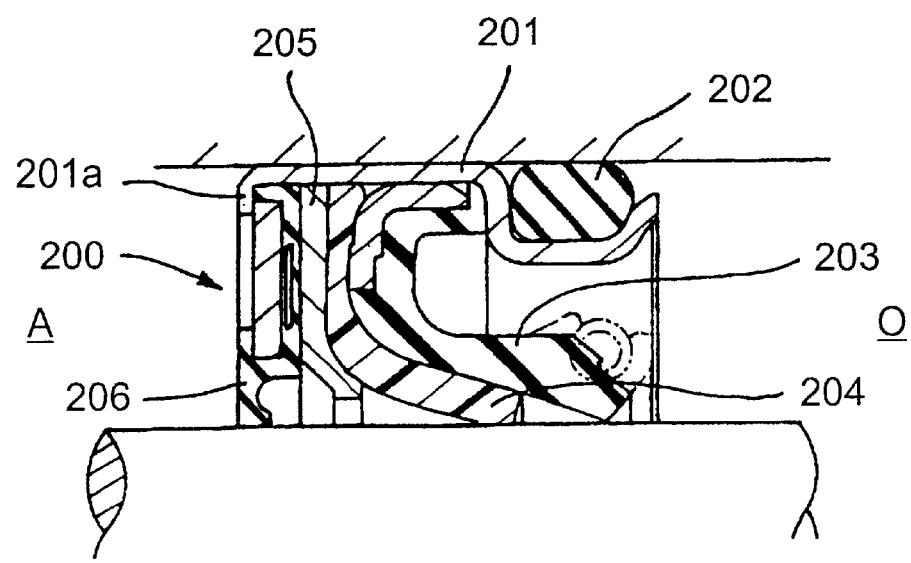
FIG. 24 is a view showing another conventional sealing apparatus.

A sealing apparatus 116 relating to Example 7 of this invention is shown in FIG. 22. Since it has the same structure as Example 3 excluding the structure of the sealing lip portion 54 of the covering portion 50, the same reference numerals are used for parts having the same structure to omit the description.

In the sealing apparatus 116, a circumferential groove 55b is provided on the radially outside of the lip tip portion 55 of the sealing lip portion 54 of the covering portion 50, and a spring 117 is installed to this groove 55b, thereby improving the following property to shaft of the lip tip portion 55. The improvement in following property to shaft thus leads to an improvement in sealing performance.

According to Example 3, the complicated and inexpensive caulking process is dispensed with in the manufacturing process since the assembly is integrally held by the covering portion, and this enables the simplification and reduction in cost of the manufacturing process. Since the generation of powder or metal powder from the metal surface-treated coating by the caulking process is thus eliminated, the quality is improved without losing the sealing function by the adhesion as foreign matter of the powder to the sealing apparatus. The quality is further improved since the problem of the rusting by breakage of the metal surface treatment coat in the caulking process never occurs.

The passage of airtight leak generated in the building of the assembly is sealed by the covering portion since the covering portion is continuously formed, and the reliability is improved. The continuous formation of the covering portion also dispenses with the complete quality control for foreign matter, flaw, forming failure and assembling failure which might lose the airtightness with respect to each member of the assembly. The manufacturing process is thus simplified, enabling a reduction in cost.

Since the peripheral surface of the first metal ring is covered with the peripheral covering portion formed of a rubber-like elastic body, the metal surface on the peripheral side is prevented from damaging the inside surface of the housing to affect the sealing property, and the sealing function on the peripheral side can be sufficiently ensured to improve the functional reliability.

According to Example 4, since the assembly is held by the covering portion formed integrally with the assembly, the complicated arid expensive caulking process is dispensed with, enabling the simplification and reduction in cost of the manufacturing process. Since the generation of powder or metal powder from the metal surface treatment coat by the caulking process is thus eliminated, the quality is improved without losing the sealing function by the adhesion as foreign matter of the powder to the sealing apparatus. The quality is further improved since the problem of the rusting by breakage of the metal surface treatment coat in the caulking process never occurs.

Since the rubber-like elastic material is entered into the clearance of each member of the assembly and filled therein in the process of vulcanization forming to seal the clearance forming the passage of airtight leak, the reliability is improved. The continuous formation of the covering portion dispenses with the complete quality control for foreign matter, flaw, forming failure and assembling failure which might lose the airtightness with respect to each member. Thus, the manufacturing process is simplified, enabling a reduction in cost.

What is claimed is:
1. A method of manufacturing a sealing apparatus, said method comprising the steps of:
   nipping a peripheral portion of a washer-shaped flat annular sealing lip formed of a resin material by a bent portion of a reinforcing metal ring for a mechanical fixing of the peripheral end portion of the flat annular sealing lip so as to form an assembly, installing the assembly in a mold, after the nipping, vulcanization-forming, after the nipping, a sealing portion formed of rubber-like elastic material in the assembly so as to cover the reinforcing metal ring, and forming a thread groove on the flat annular sealing lip while the flat annular sealing lip is being nipped.

2. The method of manufacturing a sealing apparatus as defined in claim 1, wherein the reinforcing metal ring has a recessed groove or a projection in a portion of the reinforcing metal ring which nips the annular sealing lip.

3. A method of manufacturing a sealing apparatus, said method comprising:

assembling a resin ring onto an anti-sealed fluid side of a flange portion of a first metal ring;

press-fitting a second metal ring into the anti-sealed fluid side of the resin ring within the first metal ring so as to fit an inside surface of a peripheral portion of the first metal ring to an outside surface of a peripheral portion of the second metal ring;

nipping a base end portion of the resin ring between the flange portion of the first metal ring and the flange portion of the second metal ring for the mechanical fixing of the resin ring so as to form an assembly;

forming, after the nipping, integrally a covering portion with the assembly within a mold by vulcanization forming; and forming a thread groove on the base end portion while the base end portion is being nipped.

4. The method of manufacturing a sealing apparatus as defined in claim 3, wherein a sealing lip portion is formed so as to extend axially at the sealed fluid side by bending thereof.

5. The method of manufacturing a sealing apparatus as defined in claim 3, wherein the covering portion includes a sealing portion, and a groove is formed at the anti-sealed fluid side of the sealing portion.

6. The method of manufacturing a sealing apparatus as defined in claim 3, wherein at least one of the first and second metal rings have a recessed groove or a projection in a portion of the at least one of the first and second metal rings which nips the resin ring for the mechanical fixing while the thread groove is formed.

* * * * *